United States Patent [19]

Boston et al.

[11] Patent Number: 5,757,680

[45] Date of Patent: May 26, 1998

[54] METHOD AND ARRANGEMENT FOR CONFIGURING ELECTRONIC DEVICE FOR MULTIPLE TESTING FORMATS

[75] Inventors: Ronald E. Boston, Middletown, N.J.; Daniel James McGuire, New York, N.Y.; David A. Kiley, Brick; David A. Fishman, Lakewood, both of N.J.

[73] Assignee: Lucent Technologies Inc., Murray Hill, N.J.

[21] Appl. No.: 729,479

[22] Filed: Oct. 11, 1996

[51] Int. Cl.$^6$ .................................................. H04M 3/08
[52] U.S. Cl. ........................ 364/579; 379/21; 379/27; 379/29
[58] Field of Search ..................... 364/579, 705.05; 379/21, 29, 27; 455/550, 557, 37.1, 33.2; 340/825.07, 825.44

[56] References Cited

U.S. PATENT DOCUMENTS

| | | | |
|---|---|---|---|
| 5,250,841 | 10/1993 | Sloan et al. | 257/666 |
| 5,343,461 | 8/1994 | Barton et al. | 370/13 |
| 5,406,197 | 4/1995 | Mercier et al. | 324/158.1 |
| 5,432,775 | 7/1995 | Crayford | 370/10 |
| 5,459,734 | 10/1995 | Yokoyama | 371/22.1 |
| 5,583,912 | 12/1996 | Schillaci | 379/21 |

*Primary Examiner*—James P. Trammell
*Assistant Examiner*—Kaminis Shah

[57] ABSTRACT

Disclosed is an electronic device that can communicate with a plurality of testing devices that utilize a plurality of communication formats. To accommodate the plurality of testing devices, the electronic device can be configured to communicate with external test equipment using multiple communication path configurations and multiple message protocols. An exemplary method of the present invention is a method of configuring an electronic device for communicating with either of a first or second testing device. The first and second testing devices use, respectively, first and second physical communication path configurations and first and second message protocols. As an initial matter, the method of the present invention includes identifying a presently-used testing device, the presently-used testing device comprising one of the first and second testing devices. Once the presently-used testing device is identified, the electronic device self-configures to a select physical communication path configuration, the select communication path configuration comprising that of the first and second communication path configurations which corresponds to the presently-used testing device. Next, the electronic device receives a message from the presently-used testing device, the message containing information relating to a testing routine to be performed. Once the message is received, the message protocol corresponding to the presently-used testing device is employed to obtain the information relating to the test routine to be performed. Finally, the test routine identified in obtained information is performed.

23 Claims, 6 Drawing Sheets

METHOD AND ARRANGEMENT FOR CONFIGURING ELECTRONIC DEVICE FOR MULTIPLE TESTING FORMATS

FIELD OF THE INVENTION

The present invention relates to electronic device testing, and in particular, to configuring an electronic device for operation with a plurality of testing devices that use a plurality of communication formats.

BACKGROUND OF THE INVENTION

Electronic devices are often required to meet certain industry and regulatory standards for operation and performance. For example, cellular telephones are required to meet, among other things, FCC transmission standards. Manufacturers typically test electronic devices for compliance with such standards, referred to herein as compliance testing, before shipment to distribution and retail sales facilities. Electronic devices are also often tested when they are repaired or refurbished, or if a malfunction is reported.

Compliance testing in microprocessor-controlled electronic devices is often carried out, in part, by the microprocessors within the electronic devices. In particular, the microprocessor within such a device executes the test routines that carry out the required compliance tests. Currently, microprocessors have been employed in such diverse devices as household appliances, landline telephones, and cellular telephones.

To execute a compliance test in a microprocessor-controlled electronic device, one typically employs an external test unit to communicate test instructions or messages to the microprocessor. Specifically, the test unit is first electrically coupled to the electronic device, and then transmits messages to the microprocessor that direct the microprocessor to carry out one or more test operations. An example of such a device is AT&T's model YABBA test unit, which has been developed to test AT&T's model 3770 series cellular phones.

Because many electronic products have standardized operation and performance criteria, devices from diverse manufacturers are typically tested in a similar manner. For example, cellular phones, regardless of their make and model, must be capable of tuning into a predetermined set of frequencies to meet industry standards. Despite the uniformity of operation and performance criteria, manufacturers of cellular telephones often utilize proprietary or unique communication formats. As a result, each cellular telephone manufacturer typically must provide its own test equipment. For example, AT&T's YABBA test unit utilizes a communication format that is unique to AT&T while Nokia provides a test unit that utilizes its own communication format. A communication format, as used herein, may include the physical, electrical and logical connection scheme between two devices, for example, a test unit and an electronic device to be tested.

The prevalence of proprietary communication formats for testing is undesirable from a consumer view point for a variety of reasons. For example, the repair of devices that employ proprietary test communication formats requires that electronics repair firms acquire proprietary testing equipment from several, if not all, electronic device manufacturers. Not only is this approach costly and impractical, but furthermore may not be possible as many electronic device manufacturers do not make their testing equipment generally available. Moreover, as electronic devices get older, manufacturers may cease to exist and proprietary testing equipment may be difficult or impossible to locate.

As a proposed solution to the problems discussed above, as well as others, certain industries have acted to develop and adopt standard test communication formats. Specifically, an industry may define the standard physical, electrical, and logical interface between the electronic devices and their corresponding test units. The benefit of such a system is that a single piece of test equipment may be used for testing the devices of many, if not most, of the manufacturers in that industry. Even if a standard test communication format is adopted, however, manufacturers face the problem created by the existence of products in use or on the market that were manufactured prior to the adoption of the standard. Such pre-existing products would not be compatible with the adopted industry standard communication format.

Consequently, there is a need to reduce the numbers and types of different pieces of test equipment that are required to ensure compatibility with a substantial variety of electronic device manufactures in a particular industry.

SUMMARY OF THE INVENTION

The present invention fills the above-stated and other needs by providing a test interface and method that is compatible with a plurality of testing devices, wherein the testing devices utilize a plurality of communication formats. Specifically, the test interface and method allows an electronic device to be configured to communicate using multiple communication path configurations and multiple message protocols. The present invention thus provides flexibility and greater access to compatible testing equipment.

An exemplary method of the present invention comprises configuring an electronic device for communicating with either of first and second testing devices. The first and second testing devices use, respectively, first and second physical communication path configurations and first and second message protocols. As an initial matter, the method of the present invention includes identifying a present-used testing device, the presently-used testing device comprising one of the first and second testing devices. Once the presently-used testing device is identified, the electronic device configures itself to communicate over a select communication path configuration, the select communication path configuration comprising that of the first and second communication paths which is compatible with the presently-used testing device. Next, the electronic device receives a message from the presently-used testing device, the message containing information relating to a test routine to be performed. Once the message is received, the message protocol used by the presently-used testing device is employed to obtain the information relating to the test routine to be performed. Finally, the test routine identified in obtained information is performed.

In an exemplary physical embodiment, the present invention includes a test interface for use in an electronic device. The test interface is operable to perform test routines based on test signals received from an external testing device. The test interface includes a means for connecting to one of a plurality of testing devices, and a communications port operable to receive test signals and generate test messages therefrom. The test interface also includes first and second communication path configurations that connect the communication port to the connection means. Means are also provided for enabling one of the first and second communication path configurations to facilitate communication between one of the plurality of testing devices and the communication port. Finally, the test interface includes a processor that is connected to the communication port. The processor is operable to receive test messages in at least two protocols, each of said test messages containing information relating to a test routine to be performed. The processor is further operable to identify the test routine to be performed from the information in each test message, and then perform the test routine to be performed.

The above described features and advantages, as well as others, will become readily apparent to those of ordinary skill in the art by reference to the following detailed description and accompanying drawings.

DETAILED DESCRIPTION

Figure 1:
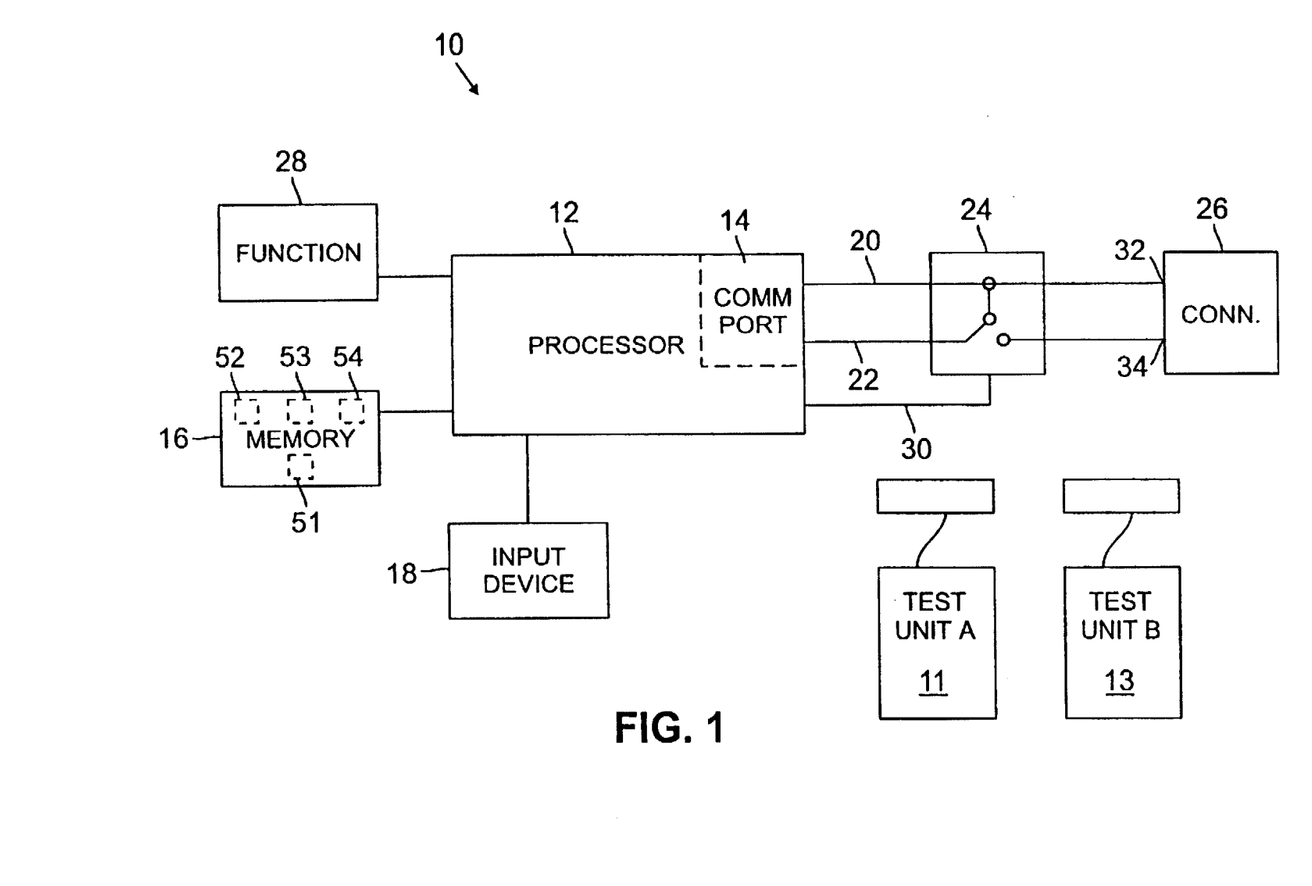
FIG. 1 shows an exemplary microprocessor controlled electronic device, including a test interface according to the present invention.

FIG. 1 shows an electronic device 10 that includes a processor 12 and may be tested for conformance with industry and/or regulatory standards. Such a device may, for example, be a cellular telephone, personal communication device, personal data assistant ("PDA"), or household appliance. The exemplary embodiment described below is a wireless or cellular telephone. For clarity of exposition, functional blocks are used to describe the circuitry in the electronic device 10. Suitable detailed circuitry for carrying out the operations of the various functional blocks are known to those of ordinary skill in the art. Furthermore, support circuitry, for example, power supplies, are not included in FIG. 1, although those of ordinary skill in the art may readily implement such circuitry as needed.

Also shown in FIG. 1 are a first test unit 11 and a second test unit 13. The first test unit 11 and the second test unit 13 are operable to test the electronic device 10 for conformance with a plurality of standard industry and regulatory operational criteria. To this end, the first test unit 11 and the second test unit 13 are operable to communicate test signals the electronic device 10. The test signals are operable to cause electronic devices to perform a plurality of test operations. Because they are operable to test conformance with standard criteria, both the first test unit 11 and second test unit 13 cause electronic devices to perform the same or similar test operations.

The difference between the first test unit 11 and the second test unit 13, however, is that they utilize different communication formats. Specifically, the first test unit 11 utilizes a first communication path configuration and a first message protocol while the second test unit 13 utilizes a second communication path configuration and a second message protocol. The first communication path configuration in the exemplary embodiment described herein is a full duplex configuration that includes one signal path dedicated to received signals and another signal path dedicated to transmitted signals. The second communication path configuration in the exemplary embodiment described herein is a half-duplex configuration that includes only one signal path for both transmitted and received signals. The first and second message protocol are discussed in further detail below.

In addition to the processor 12, the electronic device 10 includes a communication port 14, a memory 16, an input device 18, a first signal path 20, a second signal path 22, a switch circuit 24, a connector 26, and a function circuit 28. The processor 12 is connected to each of the memory 16, the input device 18 and the function circuit 28. The processor 12 is also connected to the switch circuit 24 through the first signal path 20, the second signal path 22, and a control line 30. The processor 12 is further connected to the communication port 14. Typically, the communication path 14 is integrated with the processor 12 onto a single semiconductor substrate. In the exemplary embodiment described herein, the processor 12 and communication port 14 are integrated together in a model 68HC11C0 microprocessor available from Motorola. The communications port 14 in the exemplary embodiment includes a Motorola SCI port, but may alternatively be another general purpose input/output device or UART. The first signal path 20 is a message transmit line for the processor 12 and the second signal path 22 is a message receive line for the processor 12. The processor 12 is operable to execute programming instructions and routines stored in the memory 16, as discussed further below.

The connector 26 comprises a multiple-pin connector that provides a physical connection between the electronic device 10 and either of the first and second test units 11 and 13, respectively. Other connection means, including radio frequency coupling means, optical coupling means, or other physical connection means may be used. In the present embodiment, the connector 26 includes at least first and second connection points 32 and 34, respectively, and typically includes several more similar connection points. The connector 26 is advantageously structured to receive a corresponding connector which is located on each of a plurality of external test units, including the first test unit 11 and the second test unit 13.

The memory 16 is preferably a nonvolatile type memory, such as a ROM device. The memory 16 includes or stores, among other things, programming instructions 51, a first message protocol routine 52, a second message protocol routine 53, and a test operations set 54. The program instructions 51, when executed by the processor 12, cause the processor 12 to perform the operations described below in connection with FIGS. 3 and 5. In general, however, the program instructions 51 include instructions that cause the processor 12 to enable the appropriate communication path configuration in order to receive messages from a particular test unit, and interpret messages received from that particular test unit.

The first message protocol routine 52, when executed by the processor 12, causes the processor 12 to receive and interpret messages in the first message protocol. An example of a suitable routine that may be used as the first message protocol routine 52 is described below in connection with FIG. 4. The second message protocol routine 53 is a routine that allows the processor 12 to convert messages having a second message protocol format to messages having a first message protocol format.

The test operations set 54 includes program instructions associated with a plurality of test operations. Such test operations include: operations that cause the electronic device 10 to perform functions from which measurable test results may be obtained; operations that perform various diagnostic routines; and operations that retrieve stored diagnostic and error data. Several of the test operations are standard or universal for products similar to the electronic device 10, and correspond to the testing function of the first test unit 11 and second test unit 13. Such standard or universal test operations typically include those used to test the electronic device 10 and similar devices for compliance with industry performance standards or governmental regulatory standards. Consider, for example, an electronic device 10 comprising a cellular telephone. Cellular industry standards require that cellular telephones be capable of tuning to certain frequencies. In such a case, the memory 16, and particularly, the test operations set 54 would include program instructions associated with a test operation that, when executed by the processor 12, cause the cellular telephone to tune to such frequencies.

The switch circuit 24 comprises a circuit or device that controllably couples the second signal path 22 to one of the first connection point 32 or the second connection point 34. The switch circuit 24 may suitably be an electrical or electromechanical switch with switch contacts coupled to each of the first and second connection point 32 and 34. In the exemplary embodiment, however, the switch circuit 24 comprises a plurality of buffers that are selectively enabled through the control line 30. The buffers may suitably be model 74-LVX125 buffers available from National Semiconductor. An exemplary embodiment of the switch circuit 24 is shown in further detail in FIG. 2 and discussed below.

The function circuit 28 includes the main circuitry required to carry out the operations of the electronic device 10. In the exemplary embodiment of a wireless telephone, the functional circuit 28 may include, among other things, a wireless telephone transmitter, receiver, microphone, speaker, speech network and amplification circuitry. The function circuit 28 is typically at least partially under the control of the processor 12. The function circuit 28 is often the most complex functional block in a device such as the electronic device 10. However, the details of its structure and operation do not constitute a part of this invention.

In operation, one of a plurality of test units such as the first test unit 11 or the second test unit 13 is connected to the connector 26 for the purpose of performing a test. In general, the test unit provides a test signal to the electronic device 10, thereby causing the electronic device 10 to perform a standard test operation. In order to receive and respond to the test signal, the electronic device 10 must first be configured to be compatible with the testing device that is being used.

To this end, the processor 12 first identifies the type of testing device that is connected. The connected testing device is referred to herein as the presently-used testing device. The processor 12 may suitably identify the presently-used testing device from data provided from user input through the input device 18. Specifically, in the exemplary embodiment described herein, the user provides input identifying the presently-used testing device through the telephone keypad. Alternatively, it is contemplated that the processor 12 and/or related circuitry may be able to determine the identity of the test unit automatically, such as, for example, by using and analyzing signals received through the connector 26 and the first signal path 20.

Once the identity of the presently-used testing device is determined, the processor 12 then enables or configures the proper communication path between the communication port 14 and the connector 26. In general, the processor 12 enables that of the first or second communication path configuration which is compatible with, or used by, the presently-used testing device. The physical communication path configuration is defined as an arrangement of one or more signal paths that provide the electrical interface between the connector 26 and the communication port 14. In the present embodiment, the communication path configuration includes a particular combination of the first signal path 20, second signal path 22, first connection point 32, second connection point 34, and the position of the switch circuit 24. Multiple communication path configurations may utilize one or more of the same circuit elements, as will be seen below. In other embodiments, other signal paths, connection points and switches may further be included in the communication path configuration as necessitated by the particular testing device being used.

According to the present embodiment, the processor 12 is operable to enable the appropriate communication path configuration by causing select signal paths to be connected to select connection points on the connector 26, depending on which test unit is being used. In particular, the processor 12 provides control signals to the switching circuit 24 that effectuate the appropriate interconnections.

Consider, for example, a situation in which the presently-used testing device is the first test unit 11, which uses half-duplex communications. In such a case, the processor 12 provides a control signal over the control line 30 that causes the switching circuit 24 to connect the second signal path 22 to the first connection point 32 on the connector 26. As such, signals both transmitted and received by the communication port 14 propagate through the first connection point 32. As a result, signals may only be communicated in one direction at any one instant as is the case in half-duplex communication.

By contrast, the second test unit 13 utilizes full duplex communication signals. In this configuration, the first signal path 20 is a transmit-only path and the second signal path 22 is a receive-only path. To facilitate this full duplex configuration, the processor 12 provides a signal over the control line 30 that causes the switching circuit 24 to connect the second signal path 22 to the second connection point 34.

Once the appropriate communication path configuration is enabled, the communication port 14 then receives one or more test signals containing test routine information from the testing device. However, according to the exemplary embodiment, reconfiguration of the communication port 14 is further required before messages may be communicated between the presently-used testing device and the processor 12. Each test unit may use a different communication port configuration, defined in part by a baud rate, parity bit and control bit protocols. Configuration of the communication port is described further below in connection with FIGS. 3 and 4. The communication port 14 converts the test signals into a format suitable for use by the processor 12. Such converted test signals constitute the test message.

The processor 12 receives the test message from the communication port 14. The test message contains the information relating to or specifying a test routine to be performed. According to the present invention, the processor 12 is capable of receiving test messages having at least two message structures, each corresponding to at least one message protocol. In the exemplary embodiment, the processor 12 can interpret messages having structures corresponding to either the first or second message protocols. To this end, the processor 12 operates in a manner described below in connection with FIGS. 3, 4 and 5. Once the test message is received, the processor 12 then interprets the message using the appropriate message protocol to determine the specified test. In particular, the test information in the test message includes a test routine identifier and any test routine parameters. The processor 12 then controls the operation of the electronic device 10 to perform the test routine using the test routine identifier and the test routine parameters. To this end, the processor 12 executes the program or subroutine stored in the memory 16, and in particular, the test operation set 54, that corresponds to the test routine identifier, and then incorporates the test routine parameters into the execution of that program or subroutine.

For example, consider a situation in which the first test unit 11 is employed. The processor 12 first enables the first communication path configuration and then configures the communication port 14 in an appropriate manner. The first test unit 11 then generates test signals containing a test message, the test message structured in accordance with the first message protocol. The test signals propagate through the first signal path 20 to the communications port 14. The communication port 14 receives the test signals and produces a test message therefrom. The processor 12 then receives the test message from the first test unit 11, and executes the first message protocol routine 52 to interpret or parse the message. The parsed or interpreted message yields the test routine identifier, for example, a "tune" test routine. The parsed message further yields, if necessary, test routine parameters. For example, "880 MHz" may represent a parameter for the "tune" test routine. In such a case, the processor 12 would then execute a test from the test operations set 54 that causes a radio transmitter in the electronic device 10 to tune to 880 MHz. A more detailed description of the operations of the processor 12 according to the exemplary embodiment are described below in connection with FIGS. 3, 4, and 5.

The present invention thus provides a method and apparatus by which an electronic device may be tested by any of a plurality of test units that use a plurality of communication formats. The present invention provides such capability by configuring the physical communication path to be compatible with the particular test device and interpreting messages according to the appropriate message protocol. In this manner, a variety of test units may be employed to test the electronic device for compliance with industry or regulatory standards. In the above example, both the first and second test units 11 and 13, respectively, test the same capabilities but have distinct communication formats. The electronic device of the present invention may be tested by either device.

Figure 2:
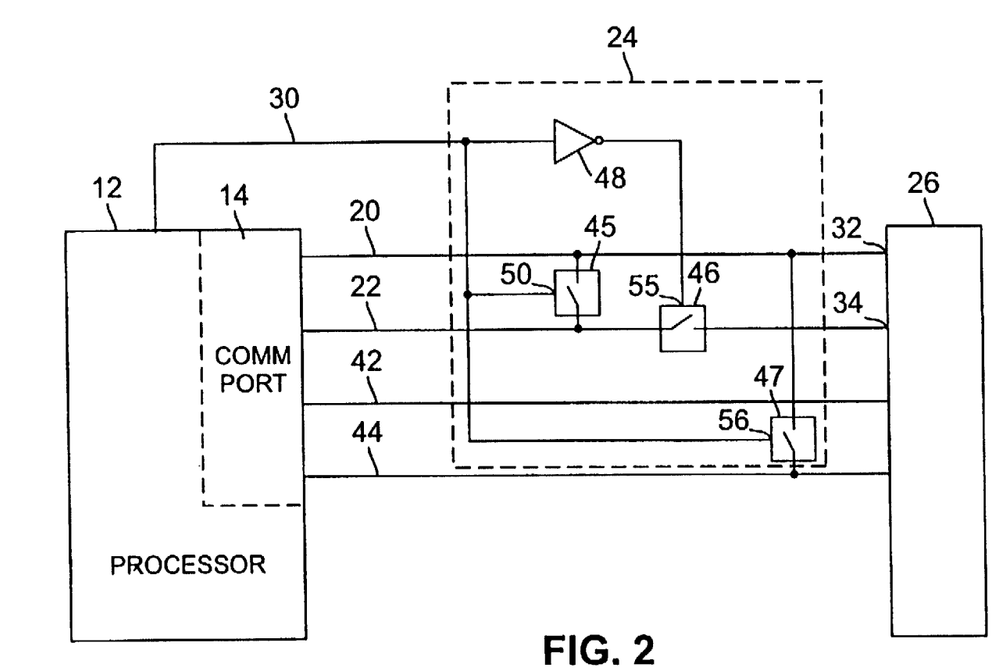
FIG. 2 shows in further detail the test interface for use in the exemplary electronic device according to the present invention.

FIG. 2 shows in further detail the communications path elements and surrounding circuitry of the exemplary embodiment of the electronic device 10 of FIG. 1. In particular, FIG. 2 shows in further detail how the electronic device 10 can be configured to communicate over either of two communication path configurations, and is specifically designed for an embodiment that includes the Motorola 68HC11C0 Microprocessor as the processor 12. For ease of reference, the reference numbers used to identify the elements in FIG. 1 are used to identify corresponding elements in FIG. 2.

FIG. 2 shows the processor 12, the communication port 14, the first signal path 20, the second signal path 22, the switch circuit 24 and the connector 26. Also included in FIG. 2 are two additional signal paths between the communication port 14 and the connector 26. These additional signal paths, a clear-to-send (CTS) line 42 and a request-to-send (RTS) line 44, enable full duplex communication in the standard UART duplex configuration. The implementation of the CTS line 42 and the RTS line 44 for use in effecting communications with the Motorola 68CH11C0 Microprocessor is well known.

In this exemplary embodiment, the switch circuit 24 includes a first switch 45, a second switch 46, a CTS switch 47, and an inverter 48. The first switch 45, second switch 46, and CTS switch 47 may all suitably be integrated circuit buffers, for example, model 74-LVX125 buffers available from National Semiconductor. The first switch 45 switchably connects the second signal path 22, or receive path, to the first connection point 32. The first switch 45 includes an enable pin 50 which is connected to the control line 30. The second switch 46 switchably connects the second signal path 22 to the second connection point 34. The second switch 46 also includes an enable pin 55, which is connected to the control line 30 through the inverter 48. The CTS switch 47 switchably connects the CTS line 42 to the first signal path 20. The CTS switch also includes an enable pin 56, which is also connected to the control line 30.

In operation, the processor 12 controls the configuration of the communication path between the connector 26 and the communications port 14 by connecting the second signal path 22 to the first connection point 32 when a half-duplex test unit is used, and connecting the second signal path 22 to the second connection point 34 when a full duplex test unit is used.

In particular, if half-duplex is used, the processor 12 provides a high logic signal to the control line 30. The high logic signal enables the first buffer 45, thereby providing a circuit connection between the second signal path 22 and the first connection point 32. The high logic signal also connects the CTS line 42 to the first signal path 20. The CTS line 42 is connected to the first signal path such that incoming signals from the test unit may be detected and used to "wake up" the processor 12. In other words, when the communication port 14 detects a signal on the CTS line 42 when in half-duplex mode, the signal is passed to the processor 12 to notify the processor that a test signal is being received. Such use of the CTS line 42 in half-duplex mode is optional.

The high logic signal also reaches the inverter 48. The inverter 48 provides an inverted high logic signal, i.e., a low logic signal, to the second switch 46, thereby breaking the connection between the second signal path 22 and the second connection point 34. The connection is broken between the second signal path 22 and the second connecting point 34 in accordance with the accepted engineering practice of eliminating active signal connections on an unused portion of a physical connector.

If, alternatively, full duplex is used, then the processor 12 provides a low logic voltage to the control line 30. The low voltage signal disables the first switch 45 and the CTS switch 47 and, after inversion, enables the second switch 46. Under this configuration, the first signal path 20 is connected to the first connection point 32, the second signal path 22 is connected to the second connection point 34, and the CTS line 42 and RTS line 44 are operably connected to the connector 26 for full duplex communications as is known in the art.

The above circuit is given by way of example. In alternative embodiments, the potential test units may require additional or other signal paths for other purposes. If so, such signal paths may readily be implemented and moreover, additional buffers or switches may be employed to enable or disable such signal paths as required for each potential test unit. Those of ordinary skill in the art may readily modify the circuit illustrated in FIG. 2 to accommodate the communication path configuration required by a set of potential test units with which the device is to be compatible.

Figure 3:
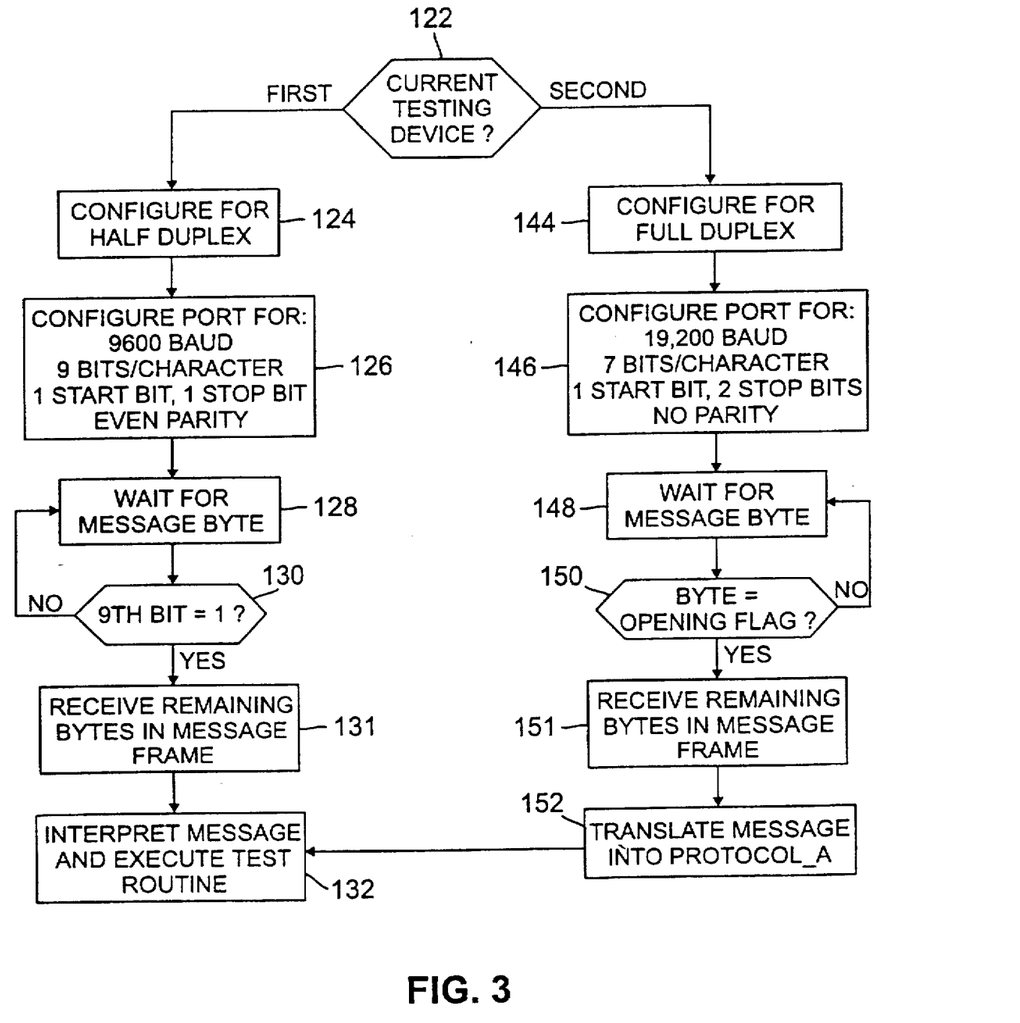
FIG. 3 shows a detailed flow diagram of operations performed by the processor to determine and perform a test routine identified in an incoming test message.

FIG. 3 shows in further detail the operation of a processor which may suitably be the processor 12 in the exemplary embodiment described in FIG. 1 above. In particular, FIG. 3 illustrates the operations performed by a processor to configure an electronic device to communicate with either of two test units, and namely, a first test unit and a second test unit such as those discussed above in connection with FIG. 1. Table 1 below provides exemplary communication format details for the first test unit and the second test unit. The communication format details in Table 1 are given by way of example only and may readily be substituted by other testing protocols by those of ordinary skill in the art.

TABLE 1

| First Test Unit | |
| --- | --- |
| First Communication Path Configuration: | half-duplex |
| First Communications Port Configuration: | 9,600 baud |
| | 9 bits/character |
| | 1 start bit |
| | 1 stop bit |
| | No parity |
| First Message Protocol: | Protocol_A |
| Second Test Unit | |
| Second Communication Path Configuration: | full duplex |
| Second Communications Port Configuration: | 19,200 baud |
| | 8 bits/character |
| | 1 start bit |
| | 1 stop bit |
| | Even parity |
| Second Message Protocol: | Protocol_B |

Figure 6:
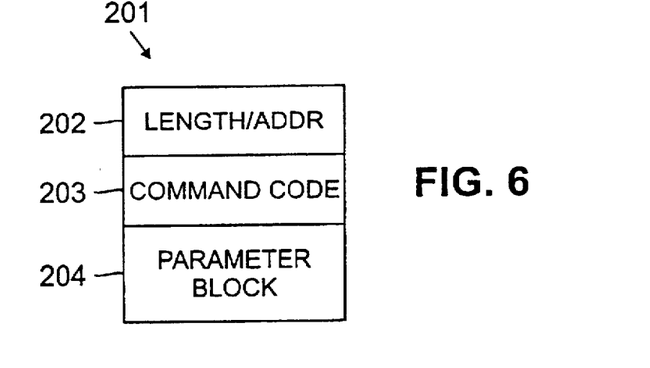
FIG. 6 shows an exemplary first message protocol utilized by a first testing device.
Figure 7:
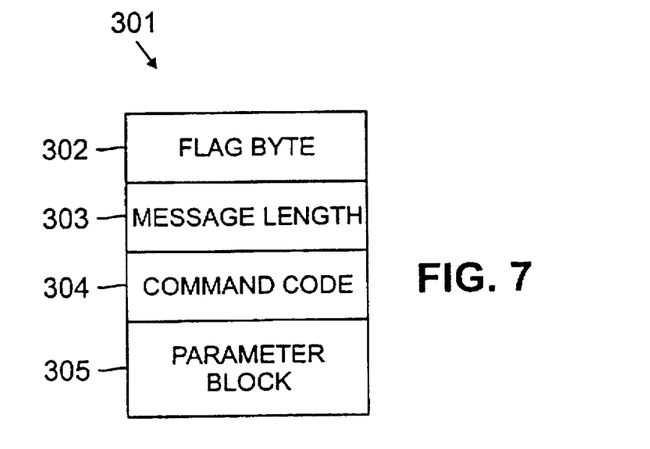
FIG. 7 shows an exemplary second message protocol utilized by a second testing device.

Protocol_A, which is illustrated in FIG. 6, utilizes a four byte message frame 201, including a message length/address byte 202, a command code byte 203, and a parameter block 204 comprising two bytes. Protocol_B, which is illustrated in FIG. 7 utilizes a six byte message frame 301, including a flag byte 302, a message length byte 303, a command code byte 304 and a parameter block 305 comprising three bytes.

Referring again to FIG. 3, the presently-used testing device is first identified in the manner described above in connection with FIG. 1 (step 122). For example the identify of the presently-used testing device may be provided by user input. If the presently-used testing device is the first test unit, then steps 124 through 132 are performed. If, however, the presently-used testing device is the second test unit, then steps 144 through 152 and step 132 are performed.

Specifically, if the presently-used testing device is the first test unit, then the processor provides the control signals to enable the proper communication path configuration for half-duplex communication (step 124). For example, in the circuit illustrated in FIGS. 1 and 2, the processor 12 would provide an appropriate control signal over the control line 30 to enable the select physical communication path configuration. Referring again to FIG. 3, the processor next configures a communication port on the electronic device, such as, for example, the communication port 14 of FIGS. 1 and 2 to receive messages from the first test unit (step 126). In particular, the processor configures the communication port to receive messages at 9600 baud, with 9 bits/character, 1 stop bit, 1 start bit, and no parity. Those of ordinary skill in the art may readily configure a communication port such as a UART to receive messages having such specifications. Once the communication port is configured, the processor waits until it receives a message byte over the first signal path (step 128).

When the message byte is received, then it is determined whether the message byte constitutes an appropriate "start" byte (step 130). For example, in a 9 bit/character message byte, the ninth bit may be used as a flag bit that signals a start byte. Accordingly, step 130 may simply include a determination of whether the ninth bit of the received byte is equal to 1. If the answer in step 130 is yes, then the processor proceeds to step 131. If not, however, the processor 12 returns to step 128 to receive another byte.

Figure 4:
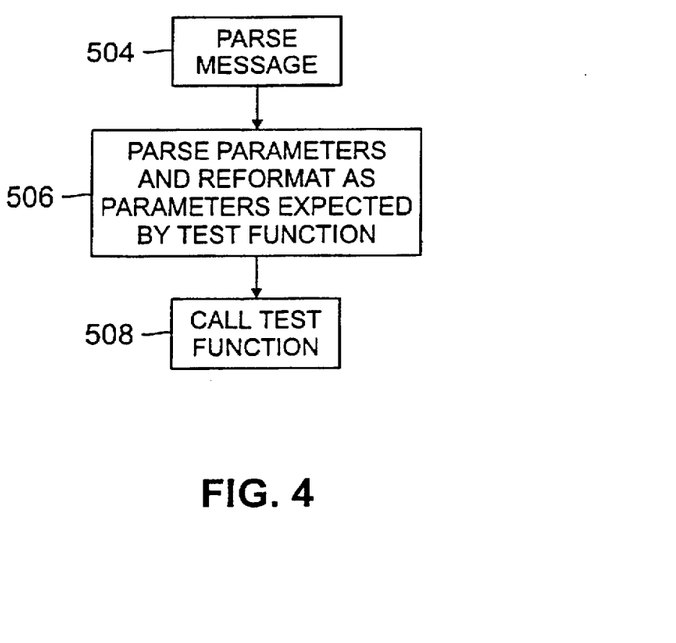
FIG. 4 shows in further detail the message interpretation and processing steps of FIG. 3.

If a valid message has been received, then the processor 12 obtains the remaining message bytes that make up the test message (step 131). To this end, the processor receives and stores subsequent message bytes in a connected memory device, which may suitably be the memory 16 or FIG. 1, until the expected number of bytes for a message have been received. In the exemplary embodiment discussed herein, a total of four bytes are expected for a Protocol_A-type message. Once the entire test message has been received, the processor interprets the message in order to obtain the test routine identifier and any corresponding test routine parameters, and executes the corresponding test routine (step 132). FIG. 4 discusses in further detail the message interpretation operations of step 132.

Some test routines require that the electronic device perform an externally observable function, such as tuning a radio transmitter in a cellular phone. Other test routines require that the processor generate outgoing messages containing test data. The test data provided in the outgoing messages would be received and analyzed by the testing device. The generation of such outgoing messages are discussed in further detail in connection with FIG. 5.

Returning to step 122, if it is determined that the second test unit is being used, then the processor proceeds to step 144. In such a case, the processor first provides a control signal that enables the proper physical communication path configuration to accomplish full duplex communication (step 144). The processor also configures the communication port, for example, the UART, to communicate using 19,200 baud, 7 bits/character, 1 start bit, 2 stop bits, and no parity (step 146). Once the proper physical communication path configuration is enabled and the communication port is configured, the processor then receives a test message from the second test unit and retrieves the first byte therefrom (step 148).

After the first message byte is retrieved, the processor determines whether the message byte is a valid first byte in accordance with the Protocol_B. Accordingly, the processor determines whether the message byte is equal to an expected opening flag byte value (step 150). If so, then the processor proceeds to step 151. If not, however, then the processor returns to step 148 to retrieve another byte.

When the processor determines that it has received a valid first message byte, then the processor stores the remaining bytes in the message as they are received in the connected memory device (step 151). To this end, the processor accepts each subsequent byte received from the communications port until the expected number of bytes for the message have been received. In the exemplary embodiment described herein, the expected number of bytes for a Protocol_B-type message is six. Once the entire message has been received, the processor employs a routine stored in the memory, such as the second message protocol routine 53 of FIG. 1, to translate the message from Protocol_B to Protocol_A (step 152).

The routine utilized in step 152, the command codes and parameter block information from Protocol_B to the corresponding command codes and parameter block information from Protocol_A. Because the first test unit and the second test unit are designed to perform industry and/or governmental agency standard tests, corresponding or analogous command codes and parameter block information exist in both protocols. In other words, for example, the first test unit may have a "DO_TUNE" command code that instructs the processor to tune to a certain frequency while the second test unit has a "TUNE_TEST" command that accomplishes the same purpose. The second message protocol routine 53 in such a case would correlate the TUNE_TEST command to the DO-TUNE command.

Once the processor translates the test message from the Protocol_B format into the Protocol_A format, the processor executes step 132 in order to interpret the message and execute the appropriate test routine in the same manner as described above.

FIG. 4 illustrates in further detail the message interpretation and processing operation of step 132 from FIG. 3. In particular, step 132 from FIG. 3 is expanded into steps 504, 506 and 508. The test task first parses the message, and particularly the command code, to isolate and determine the desired test function (step 504). To this end, the processor may use a look up table to determine the test function. Such a look up table would correlate Protocol_A command codes to executable test functions. Once the test function is identified, the test parameters in the test message are parsed and reformatted as parameters expected by the desired test function (step 506). Finally, the processor calls the desired test function and passes to it the reformatted parameters (step 508).

Figure 5:
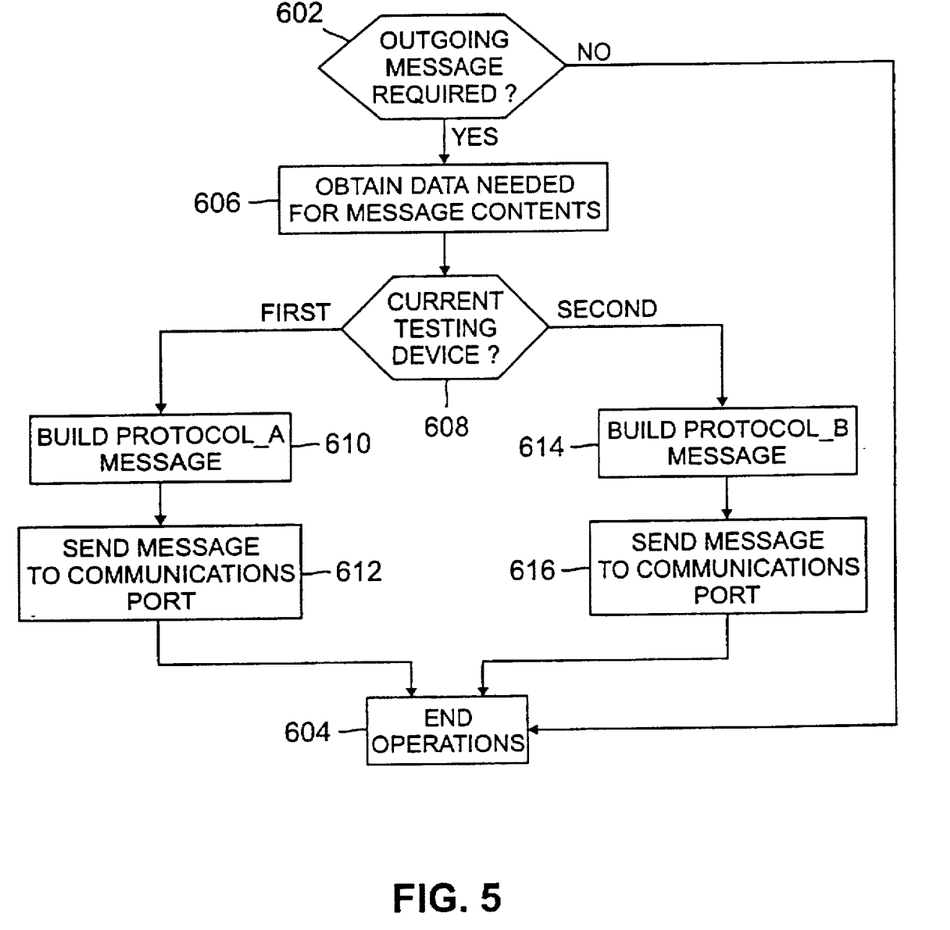
FIG. 5 shows a detailed flow diagram of the operations performed by the processor during a test routine that requires an outgoing message.

FIG. 5 illustrates a detailed flow diagram of the operations of the processor in connection with outgoing messages. The flow diagram of FIG. 5 may suitably extend directly from step 132 of FIG. 3. Accordingly, after step 132 of FIG. 3, the processor determines whether the test routine requires an outgoing message (step 602). If not, then the processor ends that test operation step 604. If, however, an outgoing message is expected, then the processor 12 obtains the data needed for the outgoing message contents (step 606). In the embodiment shown in FIG. 1, the data required for outgoing messages is usually available within the processor 12 itself, from the memory 16, or from the device function circuit 28. For example, the outgoing message may comprise an error log that is maintained by the processor 12. Such an error log is normally stored in the memory 16. Accordingly, the processor 12 would in step 606 retrieve the error log from the memory 16.

Once the outgoing message contents have been retrieved, the processor branches to a set of instructions depending on whether the presently-used test device is the first test unit or the second test unit (step 608). If the presently-used test device is the first test unit, then the processor proceeds to execute steps 610 and 612. In particular, the processor first builds an outgoing message having a Protocol_A format (step 610). Then, the processor prepares and sends the outgoing message bytes to the communication port 14 for subsequent transmission (step 612). If, however, it is determined in step 608 that the presently-used test device is the second test unit, then the processor executes steps 614 and 616. In such a case, the processor first builds an outgoing message having a Protocol_B compatible format (step 614). The processor then prepares and provides the outgoing message bytes to the communication port for subsequent transmission (step 616). After the processor executes either step 612 or 616, the processor ends its operations in connection with the original received test message (step 604).

The present invention thus provides a method and apparatus by which multiple testing devices may be utilized to test the operation and performance of the microprocessor-controlled device. By configuring the physical communication path appropriately and having the capability of interpreting multiple message protocols, the apparatus and method according to the present invention can accommodate several testing devices. It should be noted that physical interconnection compatibility, in other words, the ability of the connector 26 of FIGS. 1 and 2 to be affixed to certain testing devices may require an adapter/connector. Suitable adaptation methods and apparatus for mating test device connectors with the connectors of electronic devices to be tested would be readily apparent to those of ordinary skill in the art.

It will be understood that the above embodiments are merely illustrative. Those of ordinary skill in the art may readily develop other implementations that incorporate the principles of the present invention and fall within the spirit and scope thereof. For example, the processor 12 of FIG. 1 should in no circumstance be limited to the model 68HC11C0 microprocessor discussed in connection with the exemplary embodiment described herein. Other electronic devices will naturally include other processing devices, most of which may be programmed to carry out the necessary operations to practice the present invention. Furthermore, while the embodiments described herein relate to an electronic device that is compatible with first and second testing units, the principles of the present invention are equally applicable to, and readily implemented in, electronic devices that are compatible with three or more diverse test units.

We claim:

1. A method of configuring an electronic device for communicating with either one of at least a first and second testing device, the first and second testing devices using, respectively, first and second communication path configurations, the first and second testing devices further using, respectively, first and second protocols, the method comprising:

a) determining a presently-used testing device, the presently-used testing device comprising one of the first and second testing devices;

b) enabling the electronic device to communicate using a select communication path configuration, the select communication path configuration comprising that of the first and second communication path configurations which is used by the presently-used testing device;

c) receiving a message from the presently-used testing device, the message having a format defined by that of the first and second protocols which is used by the presently-used testing device, the message containing information relating to a test routine to be performed;

d) obtaining the information relating to the test routine to be performed from the message; and e) performing the test routine.

2. The method of claim 1 wherein step d) further comprises:

first translating the received message into a format defined by the first protocol if the received message is in a format defined by the second protocol; and interpreting the received message using the first protocol.

3. The method of claim 2 wherein step d) further comprises obtaining a test routine identifier and one or more test routine parameters from the received message.

4. The method of claim 1 wherein the first communication path configuration is a full duplex communication path configuration and the second communication path configuration is a half-duplex communication path configuration and the electronic device includes a transmit line and a receive line, and step b) further comprises interconnecting the transmit line and receive line if the select communication path configuration is the second communication path configuration.

5. The method of claim 1 wherein the first and second testing devices use, respectively, first and second communication port configurations, and wherein the method further comprises the step of configuring a communication port within the electronic device to that of the first and second communication port configurations which is used by the presently-used testing device.

6. The method of claim 1 further comprising the steps of:

f) obtaining test data for use in an outgoing message;

g) generating an outgoing message having the format defined by that of the first and second protocols which is used in the presently-used testing device, the outgoing message including the test data; and h) providing the outgoing message to the presently-used testing device.

7. A test interface for use in an electronic apparatus, the test interface operable to perform test routines, the testing arrangement comprising:

a) a connector for connecting to one of a plurality of testing devices, said connector including a first connecting point and a second connecting point;

b) a communications port operable to receive and transmit test signals and generate test messages therefrom;

c) a first signal line connected to the communications port and further connected to the first connecting point;

d) a second signal line connected to the communications port;

e) means for connecting the second signal line to the second connecting point if a testing device being used communicates using a full duplex signal path and for connecting the second signal line to the first connecting point if the testing device being used communicates using a half-duplex signal path; and f) a processor connected to the communications port, said processor operable to:
receive test messages in at least two protocols, each of said test messages containing information relating to a test routine to be performed;
identify the test routine to be performed, and
perform the test routine to be performed.

8. The test interface of claim 7 wherein the means for connecting the second signal line to the second connecting point includes a first switch and the means for connecting the second signal to the first connecting point includes a second switch.

9. The test interface of claim 7 wherein the processor and the communications port are integrated onto a single semiconductor substrate.

10. A test interface for use in an electronic apparatus, the test interface operable to perform test routines, the test interface comprising:

a) a connection means for connecting to one of the plurality of testing devices;

b) a communication port operable to receive and transmit test message signals and generate test messages therefrom;

c) a first communication path configuration connecting the communication port to the connection means;

d) a second communication path configuration connecting the communication port to the connection means;

e) means for selectively enabling one of the first and second communication path configurations; and f) a processor connected to the communications port, said processor operable to:
receive test messages in at least two protocols, each of said test messages containing information relating to a test routine to be performed;
identify the test routine to be performed, and
perform the test routine to be performed.

11. The test interface of claim 10 wherein the communication port and the processor are integrated onto a single semiconductor substrate.

12. The test interface of claim 10 wherein the first communication path configuration further comprises a half-duplex communication path configuration and the second communication path configuration comprises a full duplex communication path configuration.

13. The test interface of claim 8 wherein said means for selectively enabling one of the first and second communication path configurations is operably connected to the processor, and wherein the processor is further operable to control the operation of the means for selectively enabling one of the first and second communication path configurations.

14. The test interface of claim 10 further comprising a memory operably coupled to the processor, said memory storing program instructions executable by the processor.

15. The test interface of claim 14 wherein said memory stores program instructions executable by said processor to cause the processor to:

interpret messages having a first message protocol format to identify the test routine to be performed from a received test message; and interpret messages having a second message protocol format by first converting the messages into messages having the first message protocol format in order to identify the test routine to be performed from a received test message.

16. The test interface of claim 10 further comprising a memory operable coupled to the processor, said memory storing data comprising:

a first message protocol routine executable by the processor to identify the test routine to be performed from a received test message;

a second message protocol routine executable by the processor to identify the test routine to be performed from a received test message; and a test operations set executable by the processor to perform the test routine to be performed.

17. The test interface of claim 10 wherein the first communication path configuration and the second communication path configuration each include one or more signal paths and at least one switch.

18. The test interface of claim 17 wherein the first communication path configuration and the second communication path configuration both include at least one common signal path.

19. The test interface of claim 17 wherein the means for selectively enabling on the first and second communication path configuration includes a control line coupled to the processor and coupled the at least one switch, and wherein the processor provides a control signal to the control line that controls the operation of the at least one switch to selectively enable one of the first and second communication path configurations.

20. The test interface of claim 17 wherein said one or more switches comprise one or more integrated circuit buffers.

21. An electronic device for performing an application function, adapted to communicate with either one of a first and a second testing device, the first and the second testing devices using, respectively, a first and a second communication path configuration, the first and the second testing devices further using, respectively, a first and a second protocol, the electronic device comprising:

application means for performing an application function;

a configurable interface for connecting the electronic device to either one of the first and the second testing devices;

means for identifying which one of the first and the second testing devices is a presently-used testing device;

means responsive to an identification of the presently-used testing device, for configuring the configurable interface to enable the one of the first and the second path configurations which is used by the presently-used testing device;

means responsive to receipt of a message from the presently-used testing device through the configurable interface, the message containing information relating to a test to be performed on the application means, said means for interpreting the message according to the one of the first and the second protocols which is used by the presently-used testing device to obtain the contained information; and means responsive to the interpretation of the message for using the obtained information to perform the test on the application means.

22. The electronic device of claim 21 wherein the application means comprises a wireless telephone.

23. An interface for use in testing an electronic apparatus, the interface adapted to communicate with either one of at least a first and a second testing device, the first and the second testing devices using, respectively, a first and a second communication path configuration, the first and the second testing devices further using, respectively, a first and a second protocol, the interface comprising:

means for connecting the electronic device to either one of the first and the second testing devices;

means for identifying which one of the first and the second testing devices is a presently-used testing device;

means responsive to the identification of the presently-used testing device for enabling the one of the first and the second communication path configurations which is used by the presently-used testing device;

means responsive to receipt of a message through the enabled one of the first and second communication path configurations, the message received from the presently-used testing device and containing information relating to a test to be performed on the application means, said means for causing the message to be interpreted according to the one of the first and the second protocol which is used by the presently-used testing device to obtain the contained information; and means responsive to the interpretation of the message for causing the test to be performed on the electronic apparatus using the obtained information.

* * * * *